US005382620A

United States Patent [19]

Nagase et al.

[11] Patent Number: 5,382,620
[45] Date of Patent: Jan. 17, 1995

[54] RESIN COMPOSITION

[75] Inventors: Yasushi Nagase; Masami Kobayashi, both of Onoda; Tatsuo Kato; Shinichi Imuta, both of Kuga, all of Japan

[73] Assignee: Mitsui Petrochemical Industries, Ltd., Tokyo, Japan

[21] Appl. No.: 63,762

[22] Filed: May 20, 1993

[30] Foreign Application Priority Data

May 20, 1992 [JP] Japan .................. 4-127089

[51] Int. Cl.$^6$ .................. C08L 23/20; C08L 23/18
[52] U.S. Cl. .................. 524/491; 524/490; 525/191; 525/240
[58] Field of Search .............. 525/191, 240; 524/490, 524/491

[56] References Cited

U.S. PATENT DOCUMENTS

| | | | |
|---|---|---|---|
| 3,455,871 | 7/1969 | Coover et al. | 260/41 |
| 3,692,712 | 9/1972 | Crouch | 525/320 |
| 4,166,057 | 8/1979 | Takemori | 525/191 |
| 4,471,085 | 9/1984 | Yamamoto et al. | 524/528 |
| 4,546,150 | 10/1985 | Shigemoto | 525/240 |
| 4,938,910 | 7/1990 | Abe et al. | 524/490 |

FOREIGN PATENT DOCUMENTS

| | | |
|---|---|---|
| 0139892 | 5/1985 | European Pat. Off. |
| 0345031 | 12/1989 | European Pat. Off. |
| 2396782 | 2/1979 | France |
| 2829376 | 1/1979 | Germany |
| 3307946 | 9/1983 | Germany |
| 57-133137 | 8/1982 | Japan |
| 58-171425 | 10/1983 | Japan |
| 60-238342 | 11/1985 | Japan |
| 59-164350 | 9/1987 | Japan |
| 62-209153 | 9/1987 | Japan |

Primary Examiner—Carman J. Seccuro, Jr.
Attorney, Agent, or Firm—Sherman and Shalloway

[57] ABSTRACT

The improved resin composition that comprises (A) 99-40 parts by weight of a 4-methyl-1-pentene based polymer, (B) 0-30 parts by weight of a butene based liquid polymer having a kinematic viscosity of 2-5000 cSt at 100° C. and (C) 1-30 parts by weight of a butene-1 based solid polymer, with the sum of (A)+(B)+(C) being 100 parts by weight. The resin composition is excellent in heat resistance, flexibility, and impact resistance.

15 Claims, 1 Drawing Sheet

RESIN COMPOSITION

BACKGROUND OF THE INVENTION

This invention relates to a resin composition, more particularly, to a resin composition that is improved in heat resistance, flexibility and impact resistance.

In food and other industries, there has been a strong demand for materials which are provided with well-balanced heat resistance, flexibility and impact resistance.

It is well known that 4-methyl-1-pentene based polymers are excellent in heat resistance, and have a melting point in the range of from 220° to 240° C.

Molded articles fabricated from such 4-methyl-1-pentene polymers, however, are poor in their flexibility and impact resistance in spite of their excellent heat resistance.

SUMMARY OF THE INVENTION

The present invention has been accomplished under these circumstances and has as an object providing a resin composition that retains the high heat resistance of the 4-methyl-1-pentene based polymers and which also excels in flexibility, and impact resistance.

In order to attain this object, the present inventors conducted intensive studies and found that a resin composition comprising a 4-methyl-1-pentene based polymer, a butene based liquid polymer and a butene-1 based solid polymer in specified proportions exhibited not only high heat resistance but also good flexibility and high impact resistance and, hence, were no bleeding. The present invention has been accomplished on the basis of this finding.

Thus, the present invention attains the aforementioned object by providing a resin composition comprising:

(A) 99 to 40 parts by weight of a 4-methyl-1-pentene based polymer;

(B) 0 to 30 parts by weight of a butene based liquid polymer having a kinematic viscosity of 2 to 5000 cSt at 100° C.; and (C) 1 to 30 parts by weight of a butene-1 based solid polymer wherein the sum of (A)+(B)+(C) is 100 parts by weight.

DETAILED DESCRIPTION OF THE INVENTION

Figure 1:
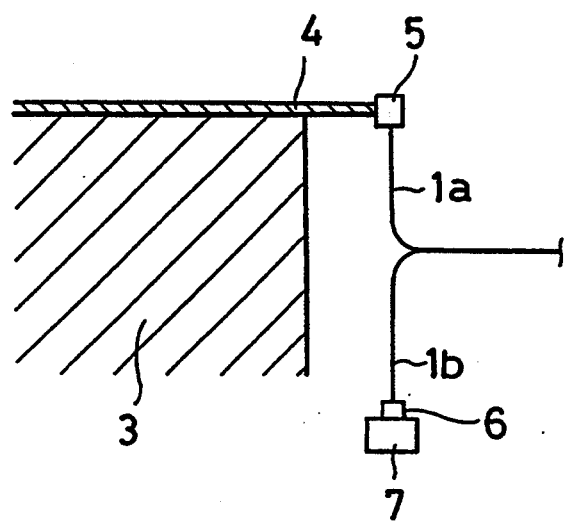
FIG. 1 is a diagram showing conceptually a method of measuring the tack of films prepared in Examples 1-5 and Comparative Example 1.

The resin composition of the present invention is described below in detail.

Component (A), or 4-methyl-1-pentene based polymer, which is the first essential component of the resin composition of the present invention is a polymer containing 4-methyl-1-pentene as a principal ingredient and may be exemplified by a homopolymer of 4-methyl-1-pentene, as well as copolymers of 4-methyl-1-pentene and other α-olefins. Exemplary α-olefins other than 4-methyl-1-pentene are α-olefins having 2-20 carbon atoms including ethylene, propylene, 1-butene, 1-heptene, 1-hexene, 1-octene, 1-decene, 1-dodecene, 1-tetradecene, 1-hexadecene, 1-octadecene and 1-eicocene. These α-olefins may be contained either alone or in admixture in the 4-methyl-1-pentene based polymer. When these α-olefins are to be contained in the 4-methyl-1-pentene based polymer, their content should be typically in the range from about 1 to 10 wt %.

The intrinsic viscosity $[\eta]$ of the 4-methyl-1-pentene base polymer as measured in the solvent decalin at 135° C. is typically in the range from about 1.0 to about 3.0, preferably from about 2.0 to about 2.5.

Component (B), or butene based liquid polymer, which is used preferably as a component of the resin composition of the present invention is a polymer containing isobutylene as a principal ingredient and may be exemplified by a homopolymer of isobutylene, as well as copolymers that contain a major amount of isobutylene and a minor amount, say, no more than 40 mol %, of other α-olefins. Exemplary α-olefins other than isobutylene include 1-butene, 2-butene and butadiene. These α-olefins may be contained either alone or in admixture in the butene based liquid polymer.

The butene based liquid polymer has a kinematic viscosity of 2–5000 cSt at 100° C.; preferably, this polymer has a kinematic viscosity of 50–1000 cSt since it contributes to the production of the resin composition excellent in moldability and quality.

Component (C), or butene-1 based solid polymer, which is the essential component of the resin composition of the present invention is a crystalline polymer containing butene-1 as a principal ingredient and may be exemplified by a homopolymer of butene-1, as well as copolymers of butene-1 and other α-olefins. Exemplary α-olefins other than butene-1 include ethylene and propylene. These α-olefins may be contained either alone or in admixture in the butene-1 based solid polymer. When these α-olefins are to be contained in the butene-1 based solid polymer, their content is typically less than 30 mol %, more preferably with less than 20 mol %. The butene-1 based solid polymer as component (C) can be prepared by polymerizing butene-1 either alone or in combination with other α-olefins in the presence of Ziegler catalyst.

The butene-1 based solid polymer (C) typically has about 20–60% crystallinity, which preferably ranges from about 30 to 50% with a view to insuring substantial effectiveness in providing improved flexibility.

The butene-1 based solid polymer (C) has a melt flow rate of 0.01–50 g/10 min, preferably 0.05–20 g/10 min, in view of providing a resin composition having satisfactory mechanical strength and good compatibility between the butene-1 based solid polymer (C) and the 4-methyl-1-pentene based polymer (A). The value of melt flow rate as specified in the present invention is measured in accordance with ASTM D 1238E.

The resin composition of the present invention is produced by molding a resin composition that comprises the above-described 4-methyl-1-pentene based polymer (A), and butene-1 based solid polymer (C), and preferably butene based liquid polymer (B).

In order to insure the production of resin composition that excels in heat resistance, flexibility, and impact resistance and which is substantially free from the bleeding of the butene based liquid polymer (B), the relative proportions of the three components (A), (B) and (C) in the resin composition are such that the component (B) is comprised in an amount of 0–30 parts by weight for 99–40 parts by weight of the component (A), and the component (C) is comprised in an amount of 1-30 parts by weight for 98-40 parts by weight of the components (A). Preferably, each of the components (B) and (C) is comprised in an amount of 3-15 parts by weight for 94-70 parts by weight of the component (A). In whichever proportions, the sum of (A)+(B)+(C) is 100 parts by weight.

The resin composition of the present invention may optionally contain one or more compounding ingredients as selected from among antioxidants, colorants, UV absorbers, inorganic fillers, antistatics, antihaze agents and heat stabilizers.

The method of producing the resin composition of the present invention is in no way limited. In a typical case, the components (A), (B) and (C) of the resin composition, as well as any of the compounding ingredients listed above which may be added as required are supplied separately into an extruder in predetermined proportions; alternatively, the individual components and ingredients are preliminarily mixed, and the mixture is supplied into the extruder; in the extruder, the mixture is melted and kneaded to prepare the resin composition, followed by extrusion through a suitable molding die such as a T-die or tube die for shaping into a film, or by injection molding. The heating temperature in the extruder or injection molding machine is typically from 240° to 300° C.

The resin composition of the present invention is excellent in heat resistance, flexibility, and impact resistance, and therefore, it may be utilized in various applications wherein both the heat resistance and the flexibility are highly required, for example, wrapping films, containers, and various other packages used in microwave oven, as well as products subjected to a high-temperature sterilization such as an retortable food package, Ringer solution transfusion bag.

The following examples and comparative examples are provided for the purpose of further illustrating the present invention but are in no way to be taken as limiting.

EXAMPLE 1

Ninety parts by weight of poly4-methyl-1-pentene (MX021 of Mitsui Petrochemical Industries, Ltd.), 5 parts by weight of liquid polybutene (B) (HV300 of Nippon Petrochemicals Co., Ltd.; kinematic viscosity, 630 cSt at 100° C.) and 5 parts by weight of polybutene-1 (C-1) (Beaulon M2181 of Mitsui Petrochemical Industries, Ltd.; melt flow rate, 1.0 g/10 min; density, 0.900 g/cm$^3$; m.p. 71° C.) were mixed in a Henschel mixer to prepare a resin composition. The resin composition was then supplied into an extruder, in which it was melted and kneaded at a molding temperature of 290° C. The melt was extruded through a T-die to yield an overwrap film 12 μm thick and 300 mm wide.

The yield strength, breaking strength, elongation, modulus, tear strength, haze, gloss, tack and heat-resisting temperature of the overwrap film thus produced were measured by the methods to be described below and the results are shown in Table 1.

Yield strength, breaking strength and elongation
Measured in accordance with ASTM D 882.
Tear Strength
Measured in accordance with ASTM D 1952 (Elmendorf tear test).
Haze
Measured in accordance with ASTM D 1003.
Gloss
Measured at 60° in accordance with ASTM D 523.
Tack Two films 8 cm wide by 10 cm long that had been aged at 40° C. for 1 week after molding were placed in superposition and passed between press rolls at a nip pressure of 0.2 kg/cm$^2$, thereby preparing a test piece in which the two films were held in intimate contact with each other in all areas except a width of 2 cm from one side of the film.

Then, the test piece was set up as shown in FIG. 1 in which it is indicated by 1; and end portion 2 of one film 1a on the side of the test piece 1 where the two films were not held in intimate contact with each other was secured by means of double-coated tape to an end portion 5 of support 4 fixed on a table 3. Furthermore, a load 7 was put on an end portion 6 of the other film 1b on the same side of the test piece 1 (where the two films were not held in intimate contact with each other) in an atmosphere of 23° C.×50% RH. The load was successively replaced by heavier ones until the superposed films 1a and 1b of the test piece 1 separated from each other, whereupon the load 7 to started to move. The weight (in grams/8 cm) of the load applied at that time was measured as the tack of the film.

Heat-resisting temperature

Figure 2:
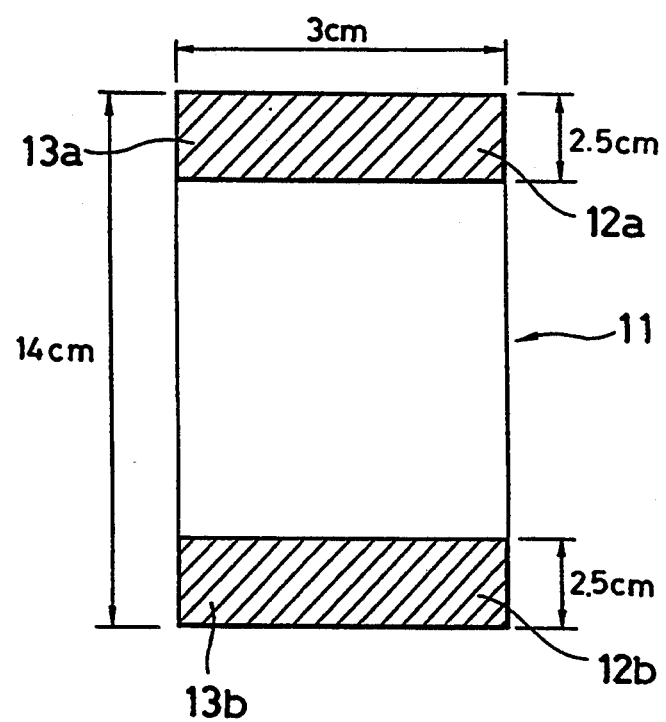
FIG. 2 is a diagram showing the test piece used to measure the hear-resisting temperature of films prepared in Examples 1-5 and Comparative Example 1.

As shown in FIG. 2, a heat-resistant overwrap film 11 measuring 3 cm wide by 14 cm long was provided and sheets of flat-grained paper 13a and 13b and each measuring 3 cm wide by 2.5 cm long were superposed on an upper end 12a and a lower end 12b, respectively, of the overwrap film 11 and the corresponding members were bonded together with double-coated adhesive tape to prepare a test piece.

The upper end 12a of this test piece was secured to a jig and a load weighing 10 g was applied to the lower end 12b. Immediately after this setup operation, the test piece was put into an air oven and heated with the temperature raised in 5° C. increments at 1-h intervals until the sample broke. The maximum temperature which the sample could withstand without break was designated as the "heat-resisting temperature" of the sample.

EXAMPLE 2

A heat-resistant overwrap film was prepared by repeating the procedure of Example 1, except that poly4-methyl-1-pentene, liquid polybutene and polybutene-1 (C-1) were mixed in relative proportions of 85, 5 and 10 parts by weight, respectively. The film was measured for its yield strength, breaking strength, elongation, modulus, tear strength, haze, gloss, tack and heat-resisting temperature. The results are shown in Table 1.

EXAMPLE 3

A heat-resistant overwrap film was prepared by repeating the procedure of Example 1, except that polybutene-1 (C-1) was replaced by polybutene-1 (C-2) (Beaulon M3080 of Mitsui Petrochemical Industries, Ltd.; melt flow rate, 0.2 g/10 rain; density, 0.890 g/cm$^3$; m.p. 98° C.). The film was measured for its yield strength, breaking strength, elongation, modulus, tear strength, haze, gloss, tack and heat-resisting temperature. The results are shown in Table 1.

EXAMPLE 4

A heat-resistant overwrap film was prepared by repeating the procedure of Example 1, except that poly4-methyl-1-pentene, liquid polybutene and polybutene-1

(C-2) which replaced polybutene-1 (C-1) were mixed in relative proportions of 85, 5 and 10 parts by weight, respectively. The film was measured for its yield strength, breaking strength, elongation, modulus, tear strength, haze, gloss, tack and heat-resisting temperature. The results are shown in Table 1.

EXAMPLE 5

A heat-resistant overwrap film was prepared by repeating the procedure of Example 1, except that poly4-methyl-1-pentene, liquid polybutene and polybutene-1 (C-2) which replaced polybutene-1 (C-1) were mixed in relative proportions of 85, 7 and 8 parts by weight, respectively. The film was measured for its yield strength, breaking strength, elongation, modulus, tear strength, haze, gloss, tack and heat-resisting temperature. The results are shown in Table 1.

COMPARATIVE EXAMPLE 1

A heat-resistant overwrap film was prepared by repeating the procedure of Example 1, except that the resin composition from which the film was molded was replaced by a composition consisting of 90 parts by weight of poly4-methyl-1-pentene and 10 parts by weight of liquid polybutene. The film was measured for its yield strength, breaking strength, elongation, modulus, tear strength, haze, gloss, tack and heat-resisting temperature. The results are shown in Table 1.

290° C. The melt was extruded through a T-die to yield an film 200 μm thick and 300 mm wide.

The yield strength, modulus, tear strength, haze, impact strength, bleeding property and heat resistance of the film thus produced were measured by the methods to be described below and the results are shown in Table 2.

Yield strength and modulus
  Measured in accordance with ASTM D 882.
Tear strength
  Measured in accordance with ASTM D 1992 (Elmendorf tear test).
Haze
  Measured in accordance with ASTM D 1003.
Bleeding property
  A test piece 50 mm wide by 50 mm long was prepared by cutting the film 200 μm thick. After heating in an air-oven at 80° C. for 2 hrs, the test piece was evaluated a touching feel with the following criterion.
    o non-slimy or non-sticky
    x slimy or sticky
Heat resistance
  The resin composition was supplied into a injection molding machine, the feed is molded at 295° C. to prepare a test piece 50 mm thick, 50 mm high and having the diameter of 46 mm. After heating in an air-oven at 160° C. for 30 minutes, the test piece was evaluated a shape by visual inspection with the following criterion.

TABLE 1

| Run No. | Composition poly4-methyl-1-pentene | liquid poly-butene | poly butene-1 | Film thickness (μm) | Tensile characteristics 2% modulus (kg/cm²) | breaking strength (kg/cm²) | elongation (%) | Tear strength (kg/cm² L/T*) |
|---|---|---|---|---|---|---|---|---|
| Ex. 1 | Mx021 (90) | HV300 (5) | M2181 (5) | 11.9 | 3249/3420 | 500/227 | 160/570 | 9/9 |
| Ex. 2 | Mx021 (85) | HV300 (5) | M2181 (10) | 13.1 | 3255/3016 | 426/231 | 180/560 | 7/13 |
| Ex. 3 | Mx021 (90) | HV300 (5) | M3080 (5) | 11.4 | 3177/3201 | 491/272 | 180/570 | 15/17 |
| Ex. 4 | Mx021 (85) | HV300 (5) | M3080 (10) | 11.5 | 2898/2895 | 470/233 | 180/550 | 10/14 |
| Ex. 5 | Mx021 (85) | HV300 (7) | M3080 (8) | 11.4 | 2725/2965 | 454/224 | 240/540 | 10/20 |
| Comp. Ex. 1 | Mx021 (90) | HV300 (10) | — | 12.0 | 5481/5615 | 500/284 | 160/480 | 40/27 |

| Run No. | Haze/gloss (%) | Tack, g/8 cm (after aging at 40° C. for 1 wk) film (180° peel) | Moldability into film | Surface state of film | Heat-resisting temperature, °C. |
|---|---|---|---|---|---|
| Ex. 1 | 0.3/144 | 1.6 | Good | Good | 190 |
| Ex. 2 | 0.4/143 | 1.6 | Good | Good | 180 |
| Ex. 3 | 0.4/149 | 2.0 | Good | Good | 190 |
| Ex. 4 | 0.3/144 | 3.4 | Good | Good | 180 |
| Ex. 5 | 0.3/144 | 3.6 | Good | Good | 180 |
| Comp. Ex. 1 | 0.4/141 | 1.4 | Good | Good | 190 |

*L = longitudinal directioin; T = transverse direction
**All figures in parentheses refer to parts by weight.

EXAMPLE 6

Seventy parts by weight of poly4-methyl-1-pentene (MX021 of Mitsui Petrochemical Industries, Ltd.), 15 parts by weight of liquid polybutene (B) (HV300 of Nippon Petrochemicals Co., Ltd.; kinematic viscosity, 630 cSt at 100° C.) and 15 parts by weight of polybutene-1 (C-1) (Beaulon M2181 of Mitsui Petrochemical Industries, Ltd.; melt flow rate, 1.0 g/10 min; density, 0.900 g/cm³; m.p. 71° C.) were mixed in a Henschel mixer to prepare a resin composition. The resin composition was then supplied into an extruder, in which it was melted and kneaded at a molding temperature of o there was neither change in shape nor fusion.
x there were changes in shape or fusion.
Impact strength
  Measure in accordance with ASTM D 3420.

EXAMPLE 7

A heat-resistant overwrap film and injection molded piece were prepared by repeating the procedure of Example 6, except that polybutene-1 (C-1) was replaced by polybutene-1 (C-2) (Beaulon M3080 of Mitsui Petrochemical Industries, Ltd.; melt flow rate, 0.2 g/10 rain;

density, 0.890 g/cm³; m.p. 98° C.). The film was measured for its yield strength, modulus, tear strength, haze, impact strength, bleeding property and heat resistance. The results are shown in Table 2.

EXAMPLE 8

A film and injection molded piece were prepared by repeating the procedure of Example 6, except that poly4-methyl-1-pentene, liquid polybutene and polybutene-1 (C-1) were mixed in relative proportions of 60, 20 and 20 parts by weight, respectively. The film and molded piece were measured for its yield strength, modulus, tear strength, haze, impact strength and heat resistance. The results are shown in Table 2.

COMPARATIVE EXAMPLE 2

A film and injection molded piece were prepared by repeating the procedure of Example 6, except that the resin composition from which the film was molded was replaced by 100 parts by weight of poly4-methyl-1-pentene. The film and piece were measured for its yield strength, modulus, tear strength, haze, impact strength, bleeding property and heal resistance. The results are shown in Table 2.

COMPARATIVE EXAMPLE 3

A film and injection molded piece were prepared by repeating the procedure of Example 6, except that the resin composition from which the film was molded was replaced by 70 parts by weight of poly4-methyl-1-pentene and 30 parts by weight of liquid polybutene. The film and piece were evaluated for its yield strength, modulus, tear strength, haze, impact strength, bleeding property and heat resistance. The results are shown in Table 2.

EXAMPLE 9

A film and injection molded piece were prepared by repeating the procedure of Example 6, except that poly4-methyl-1-pentene, polybutene-1, (C-1) were mixed in relative proportions of 70 and 30 parts by weight, respectively. The film and molded piece were evaluated for its yield strength, modulus, tear strength, haze, impact strength, bleeding property and heat resistance. The results are shown in Table 2.

The resin composition of the present invention excels in flexibility and impact resistance, as well as heat resistance since it has high heat-resisting temperatures of 160° C. Hence, the resin composition of this invention can be used in the high-temperature range where conventional flexible materials have been entirely unsuitable for use. Principally for this anticipated expansion of use, the resin composition of the present invention will offer great benefits in practice.

What is claimed is:
1. A resin composition comprising:
   (A) 94 to 70 parts by weight of a 4-methyl-1-pentene polymer which is at least one member selected from the group consisting of 4-methyl-1-pentene homopolymer and a copolymer of 4-methyl-1-pentene with an α-olefin other than the 4-methyl-1-pentene in an amount of 1 to 10% by weight of the copolymer;
   (B) 3 to 15 parts by weight of a liquid polymer having a kinematic viscosity of 2 to 5000 cSt at 100° C., which is at least one member selected from the group consisting of isobutylene homopolymer and a copolymer of isobutylene with an α-olefin other than the isobutylene in an amount of no more than 40% by mole of the copolymer; and
   (C) 3 to 15 parts by weight of a butene-1 solid crystalline polymer having a melt flow rate of 0.01 to 50 g/10 min., which is at least one member selected from the group consisting of butene-1 homopolymer and a copolymer of butene-1 with an α-olefin other than the butene-1 in an amount of no more than 30% by mole of the copolymer; wherein the sum of (A)+(B)+(C) is 100 parts by weight.

2. A resin composition according to claim 1, wherein the 4-methyl-1-pentene polymer has an intrinsic viscosity [η] in the range of 1.0 to 3.0 dl/g, measured in the solvent decalin at 135° C.

3. The resin composition according to claim 1, wherein the butene-1 polymer has a crystallinity of 20 to 60%.

4. The resin composition according to claim 3, wherein the butene-1 polymer has a crystallinity of 30 to 50%.

5. The resin composition according to claim 1, wherein the copolymer of 4-methyl-1-pentene with an α-olefin other than the 4-methyl-1-pentene is a copolymer of 4-methyl-1-pentene with an α-olefin having 2 to 20 carbon atoms.

6. The resin composition according to claim 1, wherein the copolymer of isobutylene with an α-olefin other than the isobutylene is a copolymer of isobutylene with at least one member selected from the group consisting of butene-1, butene-2, and butadiene.

7. The resin composition according to claim 1, wherein the copolymer of butene-1 with an α-olefin other than the butene-1 is a copolymer of butene-1 with at least one member selected from the group consisting of ethylene and propylene.

TABLE 2

| | poly4-methyl-1-pentene | liquid poly-butene | poly butene-1 | Tensile characteristics | | Haze (%) | Tear strength (kg/cm², L/T*) | Film impact | Bleeding property | Heat resistance (160° C.) |
| | | | | modulus (kg/cm²) | yield strength (kg/cm²) | | | | | |
|---|---|---|---|---|---|---|---|---|---|---|
| Ex. 6 | 70 | 15 | 15 | 5390 | 181 | 39 | 30/45 | 3000 | o | o |
| Ex. 7 | 70 | 15 | 15 | 5010 | 177 | 39 | 35/50 | 3200 | o | o |
| Ex. 8 | 60 | 20 | 20 | 4050 | 151 | 49 | 40/54 | 3500 | o | o |
| Comp. Ex. 2 | 100 | — | — | 9500 | 300 | 0.5 | 4/5 | 110 | o | o |
| Comp. Ex. 3 | 70 | 30 | — | 5750 | 181 | 25 | 38/54 | 2500 | x (bleeding of liquid PB) | o |
| Ex. 9 | 70 | — | 30 | 4380 | 171 | 49 | 9/11 | 1000 | o | o |

L = longitudinal directioin; T = transverse direction

8. The resin composition of claim 5 wherein the 4-methyl-1-pentene polymer has intrinsic viscosity, as measured in decalin at 135° C. in the range of from about 1.0 to about 3.0.

9. The resin composition of claim 1 wherein the liquid polymer (B) has a kinematic viscosity of 50 to 1000 cSt at 100° C.

10. The resin composition of claim 1 wherein the butene-1 solid crystalline copolymer (C) is said butene-1 homopolymer.

11. The resin composition of claim 1 wherein the butene-1 solid crystalline copolymer (C) is said copolymer of butene-1 with an α-olefin other than butene-1 in an amount of no more than 20% by mole of the copolymer.

12. The resin composition of claim 11 wherein the butene-1 solid crystalline polymer (C) has a crystallinity of from about 20% to 60%.

13. The resin composition of claim 11 wherein the butene-1 solid crystalline polymer (C) has a crystallinity of from about 30% to 50%.

14. The resin composition of claim 1, wherein the butene-1 solid crystalline polymer (C) has a melt flow rate of from 0.05 to 20 g/10 min.

15. A resin composition comprising:
(A) 94 to 70 parts by weight of a homopolymer of 4-methyl-1-pentene or a copolymer of 4-methyl-1-pentene with an α-olefin having from 2 to 20 carbon atoms, other than 4-methyl-1-pentene, in an amount of 10% by weight of the copolymer;
(B) 3 to 15 parts by weight of a liquid isobutylene homopolymer or a liquid copolymer of isobutylene with no more than 40 mole % of at least one additional α-olefin selected from the group consisting of butene-1, butene-2 and butadiene, said liquid homopolymer or copolymer having a kinematic viscosity of 50 to 1,000 cSt at 100° C.;
(C) 3 to 15 parts by weight of a solid crystalline homopolymer of butene-1 or copolymer of butene-1 with no more than about 20 mole % of ethylene, propylene, or mixture thereof, said solid crystalline homopolymer or copolymer having a melt flow rate of from about 0.05 to 20 g/10 min. and a crystallinity of from about 30 to 50%;
wherein the sum of (A)+(B)+(C) is 100 parts by weight.

* * * * *